INVENTOR
Jule A. Scholl

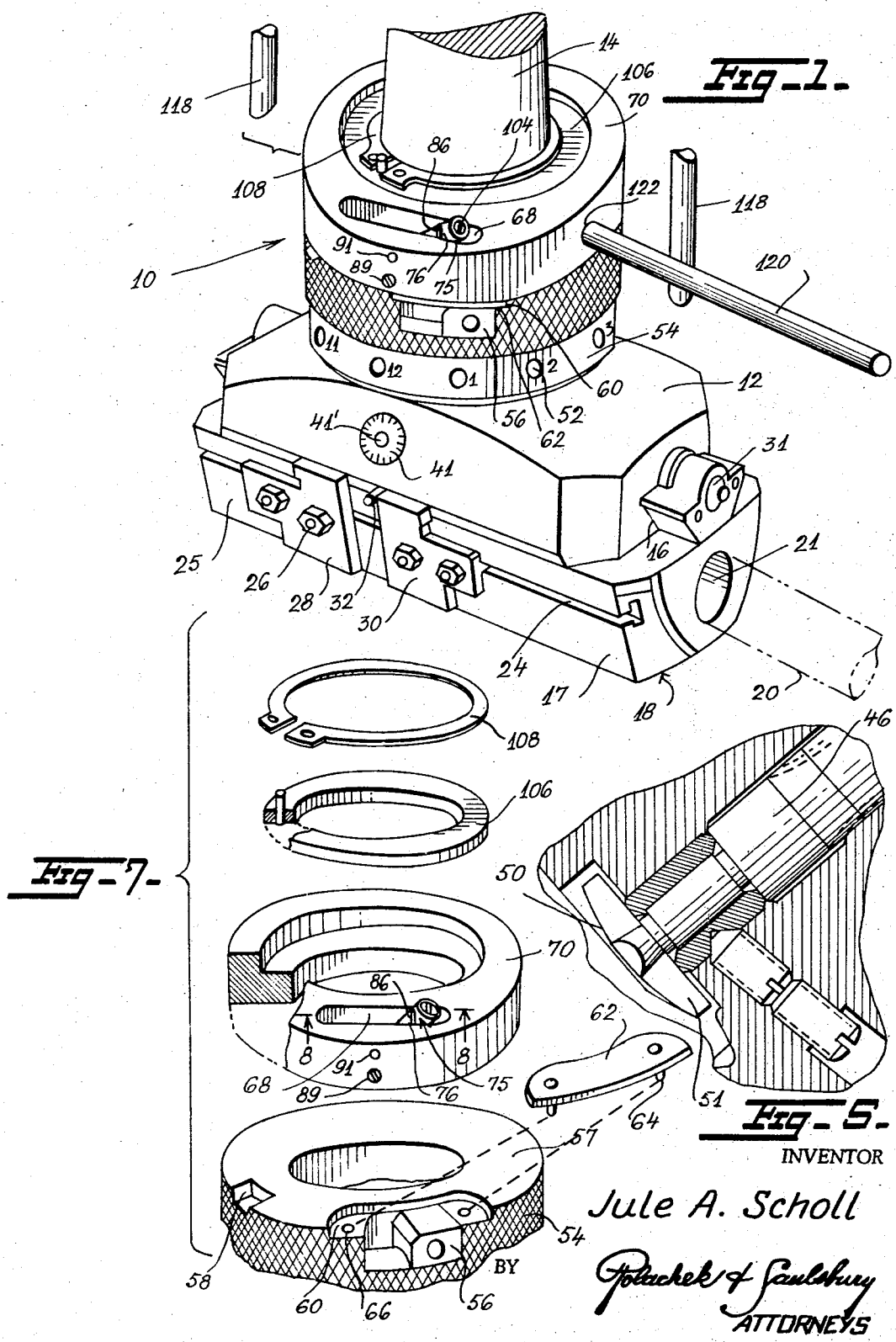

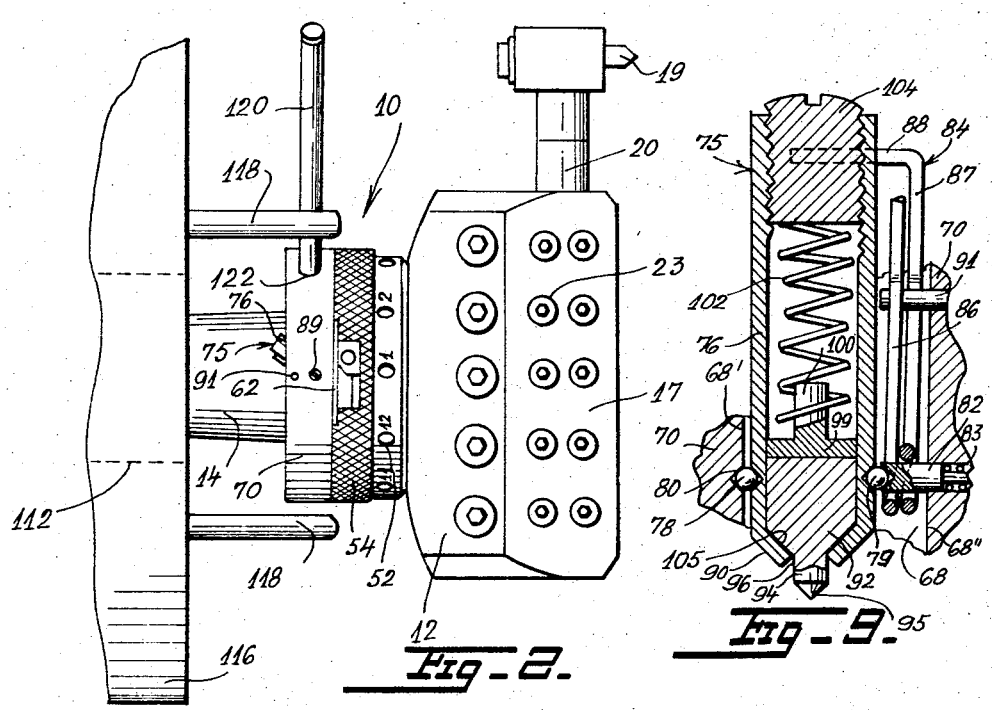
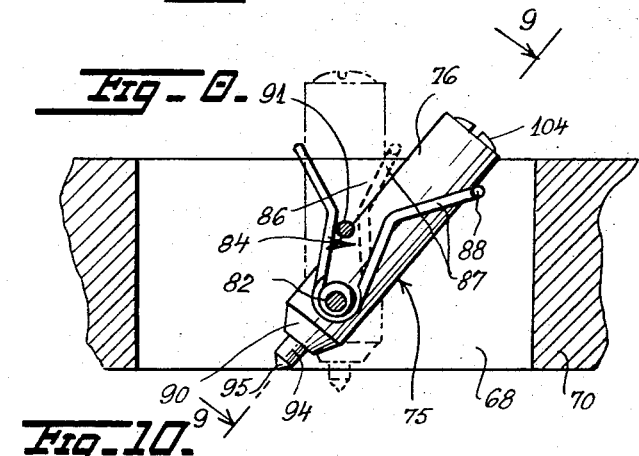
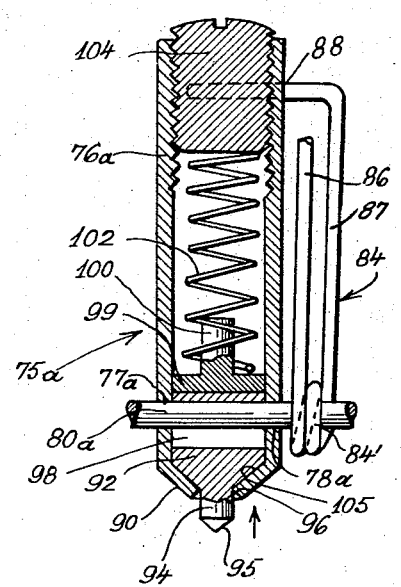
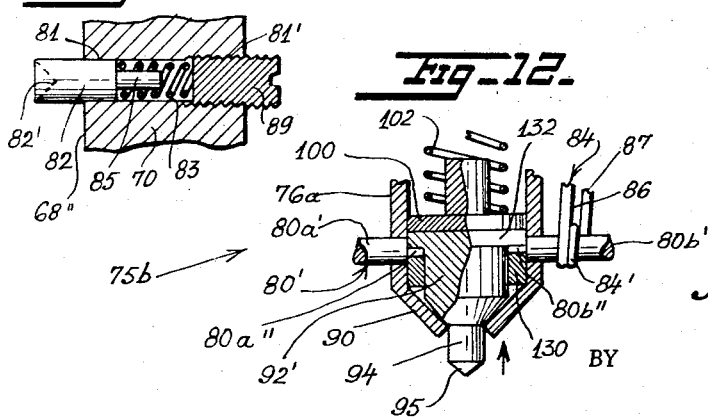

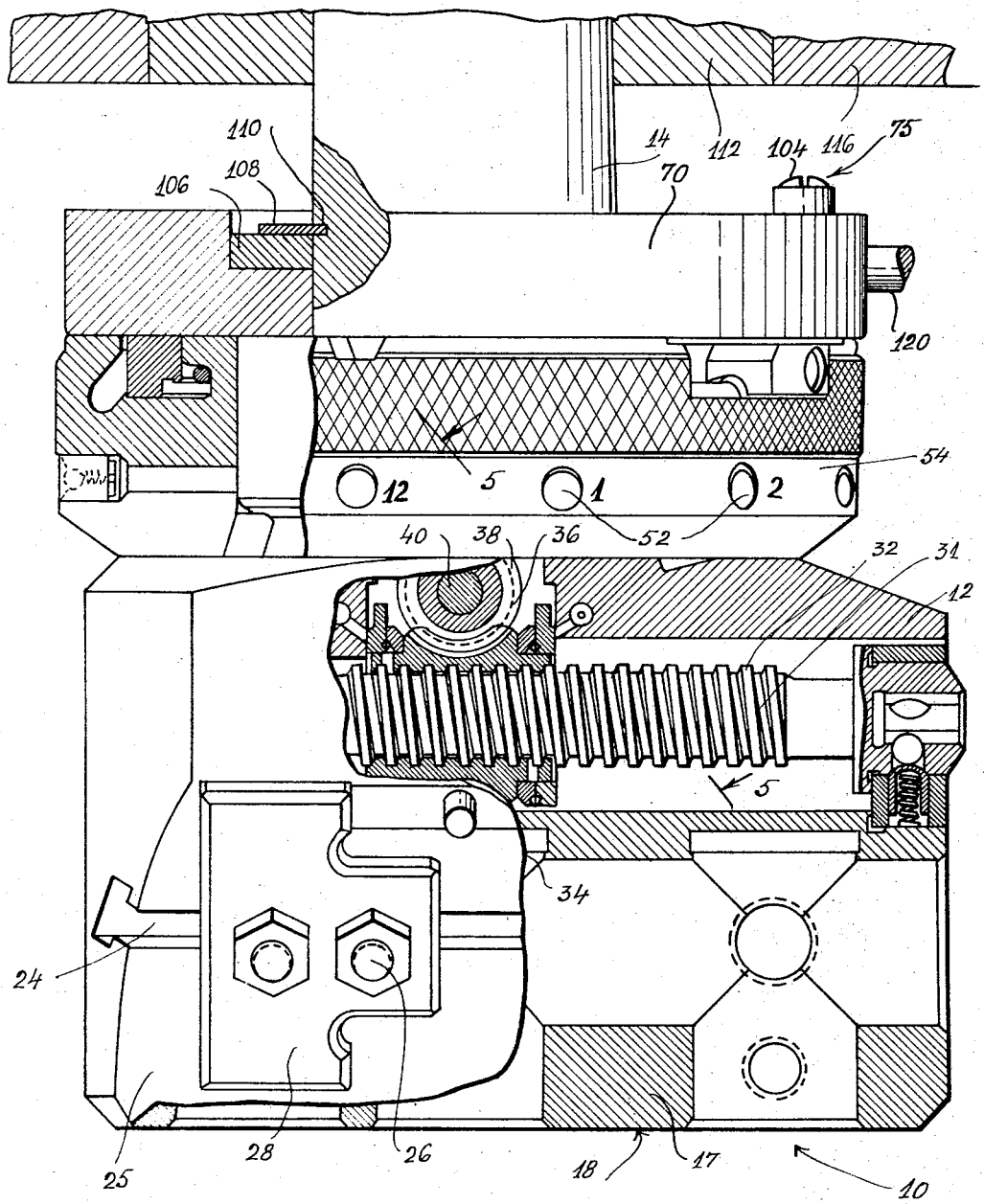

United States Patent Office 3,344,693
Patented Oct. 3, 1967

3,344,693
MEANS FOR AUTOMATICALLY ADVANCING
AND RETRACTING A TOOL HOLDER IN A
BORING AND FACING HEAD
Jule A. Scholl, 41—31 51st St.,
Woodside, N.Y. 11377
Filed Aug. 8, 1966, Ser. No. 571,016
14 Claims. (Cl. 82—1)

This invention relates to improvements in universal boring and facing heads, and more particularly concerns means for rendering automatic advance and retraction of a tool holder or carriage in such a head. The invention is especially applicable to universal boring and facing heads of the type manufactured by Emil Wohlhaupter & Co., of Frickenhausen, Germany, particularly the models currently designated UPA 4, UPA 4–S5, UPA 5, UPA 5–S6 and UPA 6–S7, but it is applicable to other boring and facing heads of similar construction.

The particular boring and facing heads mentioned have heretofore been provided with a manually operable start button which initiates advance of a tool holding carriage in a rotating head when the button is pressed. After the carriage has advanced a predetermined distance radially of the axis of the head, the carriage encounters a stop member and moves no further radially of the head, due to release of a clutch mechanism in the head which disengages the start button and returns it to an initial inactive position. To effect retraction of the carriage radially of the head to a starting position, a wrench must be inserted in the head and manually turned to operate a gear train which returns the carriage to its starting position.

It has been found that when a boring and facing head of the type described is employed in computer controlled automated machines responsive to data tape, data cards or other types of data input, manual operation of the boring and facing heads to initiate starting and retraction of tool carriage is not practical nor desirable. Considerable safety hazards are involved when an operator is required to insert his hands into an automated machine setup for starting tool carriage movements and for retracting the tool carriage. Constant personal attention of the operator is required which is objectionable in an automated installation. The present invention therefore has as a principal object to provide means for rendering automatic the start of feed and the retraction of the tool carriage in a boring and facing head.

Another object is to provide a retaining ring carrying a spring loaded toggle type indent pin which engages a drive mechanism in a boring and facing head, the toggle pin being arranged to reverse itself automatically when a preset stop is reached during a transverse movement of a tool carriage on the head.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of a boring and facing head embodying the invention.

FIG. 2 is a side elevational view on a reduced scale of the boring and facing head shown mounted with its axis horizontal on a drive mechanism.

FIG. 3 is an enlarged side elevational view of the boring and facing head, parts being broken away to show internal construction.

FIG. 5 is a further enlarged fragmentary sectional view taken on line 5—5 of FIG. 3.

FIG. 6 is an enlarged fragmentary sectional view taken on line 6—6 of FIG. 4.

FIG. 7 is an exploded perspective view of parts of the boring and facing head.

FIG. 8 is an enlarged fragmentary sectional view taken on line 8—8 of FIG. 7.

FIG. 9 is a further enlarged sectional view taken on line 9—9 of FIG. 8.

FIG. 10 is a still further enlarged sectional view of part of FIG. 9 showing details of toggle pin mounting structure.

FIG. 11 is a sectional view similar to FIG. 9 showing another mounting for the toggle pin, and FIG. 12 is a fragmentary sectional view similar to a part of FIG. 11, showing an alternate construction for the toggle pin.

Figure 4:
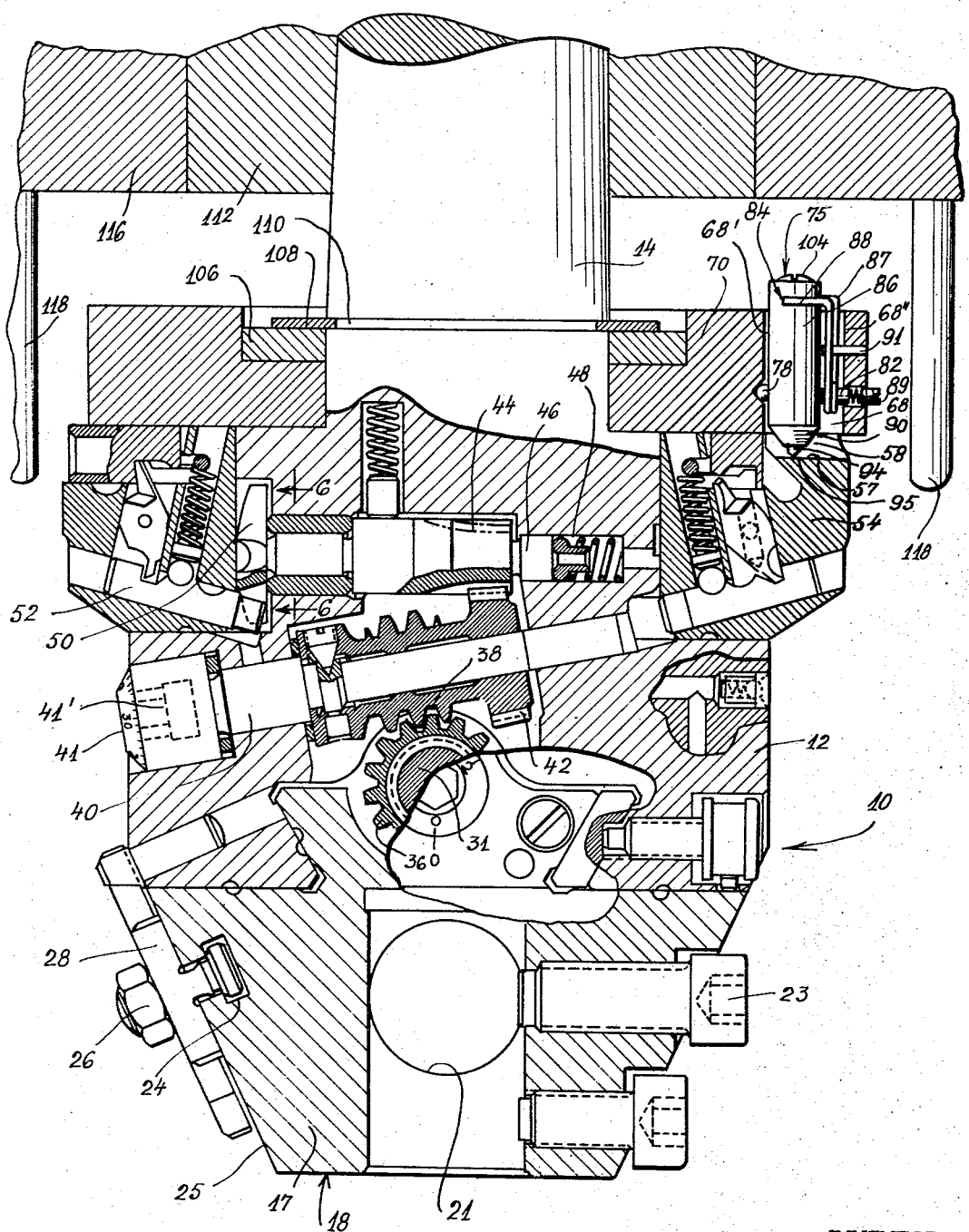
FIG. 4 is a vertical sectional view taken about 90° from the view of FIG. 3, parts being broken away and other parts being shown in side elevation.

Referring first to FIGS. 1-4, there is shown a boring and facing head 10. This head has a massive generally rectangular body 12 which is integral with a tapered shaft 14 shown axially vertical in FIGS. 1, 3, and 4 and axially horizontal in FIG. 2. The body 12 has a transverse dovetailed slot or keyway 16 at its bottom or outer end. Slidably engaged in this slot is a block 17 which serves as a carriage 18 for a tool arm 20 supporting cutting tool 19. The tool arm is removably inserted in a transverse bore 21 in the carriage and is mechanically locked therein by bolts 23.

A dovetailed or T-slot 24 is formed in the front face 25 of the carriage 18. In this slot is held by bolts 26 a pair of adjustable stop plates 28, 30. The stop plates are spaced apart on opposite sides of a stud 32 which extends outwardly of body 12 and serves as a stop member when abutted by either of plates 28, 20 to stop transverse travel of the carriage 18 with respect to the body 12 at the end of the head.

In the upper or inner end of the carriage is seated a screw shaft 31 having a helical thread 32; see FIG. 3. The shaft 31 is normally nonrotatable during forward driving and automatic retraction movements of the carriage. Rotatably mounted on the shaft 31 is a nut 34 provided with an internal helical thread engaged with the thread of shaft 31. The nut 34 is provided with worm gear teeth 36 which are engaged by the thread of a worm 38. Worm 38 is rotatably carried by a shaft 40 journaled in an inclined position across body 12; see FIG. 4. One end 41 of shaft 40 is exposed at the front face of body 12.

A spur gear 42 is integrally formed with the worm 38. This gear is meshed with a gear 44 formed on a shaft 46 rotatably journaled in a cavity 48 in body 12. At the outer end of shaft 46 at a side of body 12 is a rotatable star wheel 50. This star wheel is best shown in FIGS. 4, 5 and 6. The star wheel has lobes 51 which can engage any one of a plurality of pins 52 circumferentially mounted in a massive ring 54. The pins are retractable radially outward away from engagement with the lobes of the star wheel, but can be pushed in individually by use of a suitable tool for engagement with the lobes of the star wheel.

Ring 54 has a manually movable lever 56 shown in FIG. 7. This lever can be moved circumferentially for effecting retraction of those pins 52 which project radially inward to engage the lobes of the star wheel. On the upper face 57 of the ring is a rectangular notch or recess 58 whose purpose will be described presently. Ring 54 is mounted slidably and rotatably on body 12 concentric and coaxial with shaft 14. To the extent described, the head structure is substantially conventional but is detailed here in order that the invention may be clearly understood.

A recess 60 is formed in the upper face 57 of ring 54 to receive a plate 62. The upper surface of this plate is flush with the face 57 when the plate is mounted in recess 60 with depending pins 64 engaged in holes 66 in the ring. A chordal slot 68 is formed in a retainer ring 70 slidably mounted on ring 54 concentric and coaxial with shaft 14.

In slot 68 as best shown in FIGS. 4, and 7–10 is a pivotable toggle pin 75. This pin has a cylindrical, tubular casing 76 with recesses 77 in diametrically opposite positions near the lower end of the casing. Ball bearings 78, 79 engage in these recesses. Ball bearing 78 is seated in a recess 80 formed in one side 68' of slot 68 in ring 70. A bore 81 is formed in the other side 68" of slot 68 in ring 70. In this bore which is threaded at its outer end 81' is a horizontal pin 82 biased inwardly of 68 by a coil spring 83 engaged between a set screw 89 and the outer end of pin 82. Pin 82 has a stud 85 which fits inside of spring 83. A recess 82' at the other inner end of pin 82 engages ball bearing 79. By this means the toggle pin is freely pivotable on ball bearings 78, 79.

A generally V-shaped spring 84 is coiled tightly around pin 82 at the apex of the spring. Free upwardly extending arms 86, 87 of the spring have laterally bent fingers 88 which engage the casing 76 near its upper end on opposite sides thereof. Arm 86 abuts a pin 91 set in side 68" of slot 68. The arms 86, 87 tend to move toward each other. Thus arm 87 of the spring tends to hold the toggle pin 75 axially parallel to the axis of ring 70 and shaft 14, or axially vertical as shown in FIGS. 3 and 4, as shown in dotted lines in FIG. 8.

Casing 76 has a tapered bottom end 90 in which is slidably fitted a plug 92. This plug has a cylindrical stud 94 formed with a tapered tip 95 extending out through hole 96 in the narrow end of casing 76; see FIG. 9. On top of the plug bears a disk 99. This disk has a stud 100 engaged in the bottom end of coil spring 102 in the casing. The upper end of the spring is engaged by the inner end of a set screw 104 adjustably screwed in the upper end of the casing. The spring holds the plug which has a tapered bottom end portion 105, seated in the tapered end 90 of casing 76. The plug can retract axially inward or upward of casing 76 to retract stud 94. The stud 94 will normally ride on the upper face 57 of ring 54 but will engage in recess 58 of this ring so that the toggle pin 75 will assume an axially vertical position as indicated in dotted lines in FIG. 8.

Ring 70 is held on shaft 14 by a washer 106 and split spring ring 108. Ring 108 engages in a groove 110 in shaft 14. The shaft 14 can be removably engaged in drive shaft 112 of a computer controlled drive mechanism (not shown). The shaft 112 is journaled in stationary machine wall 116. A plurality of stationary posts 118 extend outwardly of wall 116. The posts are spaced radially from ring 70 but are axially parallel thereto for stopping rotational movement of a torque rod 120 engaged in a hole 122 in ring 70. Rod 120 extends radially outward of the ring.

In operation of the boring and facing head, suppose head 18 is fully retracted with plate 30 abutting stud 32. Now, when shaft 14 is rotated by drive shaft 112, ring 70 will be stationary because torque rod 120 contacts and is held by one of posts 118. The pointed end 95 of toggle pin 75 will contact face 57 of ring 54 which rotates part of one turn with shaft 14 and body 12. Then recess 58 reaches stud 94 and the toggle pin assumes a position axially aligned with ring 54. The rotation of ring 54 is stopped. The stationary pin or pins 52 of ring 54 now engage the lobes of star wheel 50. The wheel 50 turns part of one turn as it passes each projecting pin 52. Wheel 50 turns shaft 46 and gear 44. Gear 44 turns gear 42 which turns worm 38. Worm 38 turns nut 36 which rotates around shaft 31 causing this shaft to move axially. Carriage 18 moves with shaft 31 transversely of the head so that arm 20 and tool 19 are moved radially outward of the head.

Each time a lobe 51 passes a pin 52, the carriage is moved about 0.002 of an inch. This forward drive or advancement of the carriage continues until plate 28 reaches stud 32.

Now the carriage cannot advance any further transversely of the head 10. The gear train becomes locked back through nut 36, worm 38, gear 42, gear 44, shaft 46 and star wheel 50. The carriage, body 12 and shaft 14 all rotate together as a unit until the star wheel encounters the next pin 52, whereupon the ring 54 will be caused to rotate with body 12 and the toggle pin 75 will be tilted out of recess 58 to ride on face 57. Each time recess 58 comes around to pin 75. The pin end will engage in recess 58 and will at once come out of it as the plug 92 is forced to retract. This constitutes a declutching of the drive for the carriage so that the carriage is stationary with respect to body 12. Ring 70 remains stationary since its torque rod 120 is held by a post 118.

The head is now ready for reversal or retraction of the carriage. The rotation of drive shaft 112 can be reversed in direction and the shaft 14 can be turned at a high speed much higher than the prior speed employed in driving the tool. When shaft 112 rotates in reverse direction, carriage 18 at once begins to move in a transverse direction opposite from its former tool drive direction. This occurs because toggle pin 75 engages again in recess 58 and stays there to hold ring 54 stationary while its pins 52 turn the star wheel 50 at a much higher speed than formerly. The gear train from the star wheel drives the carriage 18 in reverse direction until plate 30 again reaches stud 32, whereupon the drive of the carriage will be stopped again as toggle pin 75 is pushed out of recess 58 in ring 54. The carriage is thus again declutched by the declutching action of the toggle pin 75. The body 12 and shaft 14 can continue to turn with the carriage 18 but the carriage will not retract any further because it has reached its original starting position.

It will be noted that no manual manipulation or turning of shaft 40 is required to retract the carriage 18. The retraction is done automatically by mere reversal of drive of shaft 112. Heretofore, shaft 40 had to be turned manually by means of a wrench applied in a noncircular recess 41' formed in the exposed end 41 of the shaft. No manually operable start button is required for initiating the tool feed of the carriage 18. Once the shaft 112 starts turning in the tool advance direction, the carriage begins to move to the right as viewed in FIG. 1 so that plate 30 leaves stud 32 while plate 28 approaches stud 32.

FIG. 11 shows another toggle pin 75a in which parts corresponding to those of pin 75 are identically numbered. In pin 75a holes 77a, 78a are formed in diametrically opposite positions near the lower end of casing 76a. A shaft pin 80a extends diametrically through the casing and holes 77a, 78a. The pin is anchored nonrotatably in aligned holes formed in opposite sides of slot 68 of ring 70. The V-shaped spring 84 is coiled tightly around the shaft pin 80a at its apex to form a ring 84' which will not rotate around the pin. The free upwardly extending arms 86, 87 of the spring have laterally bent fingers 88 which engage the casing 76a near its upper end on opposite sides thereof. The pin 91 is omitted. Thus the spring arms 86, 87 tend to hold the toggle pin axially parallel to the axis of the ring 70 and shaft 14. Pin 75a operates like pin 75 in ring 70.

FIG. 10 shows another toggle pin 75b in which parts corresponding to those of pins 75 and 75a are identically numbered. In pin 75b, pin shaft 80' has two sections 80a' and 80b' provided with studs 80a" and 80b" locked in a ring 130 inside of casing 76a. Plug 92' is narrower in diameter than plug 92 to provide room for ring 130 in which the plug slides axially of the casing. An annular flange 132 on plug 92' bears on ring 130. Plug 92' is axially movable inside of casing 76a against bias of spring 102. Spring 84 which tends to hold toggle pin 75b axially upright, has its apical loops 84' secured to pin shaft section 80b'. When installed in the ring 70 and mounted on head 10, toggle pin 75b operates in the same manner as already described for pin 75.

It will be understood that no changes are required in the shaft, body or carriage to adapt the head for automatic operation by use of ring 70 and toggle pin 75, 75a or 75b. The only changes required in rings 54 are to form recess 60 and insert plate 62 so that the ring has a smooth upper surface 57 on which the tip 95 of the toggle pin can ride.

The invention fulfills a long felt need by unexpectedly effecting economies in labor and machine working time, improvements in machining and work efficiency, prevention of accidents by eliminating manual control operations, and increased versatility of the boring and facing heads.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. A clutch device for a boring and facing head having a shaft rotatable on an axis, a body joined to said shaft and rotatable therewith, a tool supporting carriage mounted on said body and movable thereon in a straight path transversely of said axis, a gear train operatively engaged with said carriage to drive the same transversely of said body, a first ring slidably mounted on said body concentric and coaxial with said shaft, said ring having a plurality of pins selectively engaged with a member of said gear train for driving the gear train; said clutch device comprising first means for engaging and holding said ring stationary while the shaft and body rotate on said axis and the carriage moves transversely of said axis until the carriage encounters a first obstruction on said body, said clutch device further comprising yieldable means to release said ring for rotation with said body and shaft when said carriage encounters said obstruction, whereby reversal of direction of movement of said shaft results in reengagement of said first means with said ring to hold the ring stationary again while the carriage moves transversely of said axis in a reverse direction until it encounteres a second obstruction on said body.

2. A clutch device as recited in claim 1, wherein said first means comprises a second ring having a slot therein, a toggle pin pivotally carried in said slot in said second ring, means for holding said second ring stationary when the second ring is mounted on said shaft coaxial therewith and slidably abutting a smooth end face of the first named ring, said first ring having a recess in said smooth end face for engaging a free end of said toggle pin to lock the two rings together while the carriage is moving transversely of the body free from both of said obstructions.

3. A clutch device as recited in claim 2, wherein said toggle pin comprises a hollow cylindrical casing, said yieldable means comprising a plug movable axially against a spring bias in said casing, said plug having a stud with tapered end extending outwardly of one end of the casing and defining said free end of the toggle pin.

4. A clutch device as recited in claim 3, wherein said toggle pin further comprises a stationary pin shaft extending transversely through the casing and anchored in said second ring, said plug having a diametral slot to permit axial movement thereof alongside the stationary pin shaft, and a V-shaped spring secured at its apex to said pin shaft, said V-shaped spring having arms engaging opposite sides of said casing and tending to hold the toggle pin axially parallel to the axis of the second ring to engage the free end of the toggle pin in the recess in the first ring.

5. A clutch device as recited in claim 3, further comprising stationary pin shaft means pivotally supporting said casing, and a V-shaped spring secured at its apex to said pin shaft, said V-shaped spring having arms engaging opposite sides of said casing and tending to hold the toggle pin axially parallel to the axis of the second ring to engage the free end of the toggle pin in the recess in the first ring.

6. A clutch device as recited in claim 3, wherein said toggle pin further comprises a third ring in said casing surrounding said plug to guide the same in axial movement, stationary pin shaft means engaged with said third ring and pivotally supporting said casing, and a V-shaped spring secured at its apex to said pin shaft, said V-shaped spring having arms engaging opposite sides of said casing and tending to hold the toggle pin axially parallel to the axis of the second ring to engage the free end of the toggle pin in the recess in the first ring.

7. A clutch device as recited in claim 1, wherein said first means comprises a second ring, radial extending means carried by the second ring to hold the same stationary when the second ring is mounted on said shaft coaxial therewith and slidably abutting a smooth end face of the first named ring, said first ring having a recess in said smooth end face, said first means further comprising a toggle pin pivotally carried by said second ring for engaging a free end of said toggle pin in said recess, and spring means normally tending to bias the toggle pin into a position axially aligned with the axis of said ring to engage the free end of the toggle pin in said recess.

8. A clutch device as recited in claim 7, wherein said toggle pin comprises a hollow casing, said yieldable means comprising a plug movable axially against a spring biased in said casing, said plug having a stud with tapered end extending outwardly of one end of the casing and defining said free end of the toggle pin.

9. A clutch device as recited in claim 8, further comprising stationary pin shaft means pivotally supporting the casing on the second ring, said spring means being secured to said pin shaft.

10. A clutch device as recited in claim 9, wherein said spring means is a V-shaped spring having its apical end secured to the pin shaft and arms engaging opposite sides of said casing.

11. A clutch device as recited in claim 3, further comprising support means pivotally supporting said casing for rotation on a transverse diametrally extending axis, and spring having end engaged on said support means, said spring having an arm contacting one side of the casing and tending to hold the toggle pin axially parallel to the axis of the second ring to engage the free end of the toggle pin in the recess in the first ring.

12. A clutch device as recited in claim 11, wherein said support means comprises a pair of ball bearings engaged in recesses in opposite sides of the casing to permit free rotational movement of the toggle pin, and a fixed other pin secured on a side of said slot, said spring having another arm at the other side of the casing bearing on said other pin, said end of the spring being biased to tend to draw the arms of the spring together, whereby both arms of the spring contact opposite sides of the casing when the toggle pin is axially parallel to the axis of the second ring.

13. A clutch device as recited in claim 8, further comprising axially adjustable pin shaft means pivotally supporting the casing on the second ring, said spring means having an end engaged on said pin shaft and having an arm at its other end bearing on a side of the casing and tending to hold the toggle pin axially parallel to the axis of the second ring.

14. A clutch device as recited in claim 13, further comprising a fixed other pin secured on a side of said slot in the second ring, said spring having another arm at the other side of the casing bearing on said other pin, said end of the spring being biased to tend to draw the arms of the spring together, whereby other arms of the spring contact opposite sides of the casing when the toggle pin is axially parallel to the axis of the second ring.

References Cited

UNITED STATES PATENTS 2,461,732   2/1949   Hansen.

FOREIGN PATENTS 912,886   6/1954   Germany.

WILLIAM W. DYER, JR., *Primary Examiner.*

LEONIDAS VLACHOS, *Examiner.*